F. O. JAQUES, Jr.
DENTAL CROWN SHAPER.
APPLICATION FILED AUG. 11, 1910.

977,633. Patented Dec. 6, 1910.

WITNESSES:
Julia Ricci
F. Reagan

INVENTOR:
Fernando Oscar Jaques Jr.
By Charles H. Luther
ATTORNEY.

UNITED STATES PATENT OFFICE.

FERNANDO OSCAR JAQUES, JR., OF CRANSTON, RHODE ISLAND.

DENTAL-CROWN SHAPER.

977,633.  Specification of Letters Patent.  Patented Dec. 6, 1910.

Application filed August 11, 1910. Serial No. 576,702.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Dental-Crown Shapers, of which the following is a specification.

This invention has reference to an improvement in dental instruments and more particularly to an improvement in dental crown shapers.

In forming tooth crown shells the crown shell when removed from the former, usually has to be contoured, or slightly reduced or enlarged at the open end portion of the crown shell to give the exact size to the crown shell to fit the tooth to be crowned at the gingival line.

The object of my invention is to provide a dental crown shaper for contouring, reducing or enlarging the open end portion of a tooth crown shell, whereby the operation of fitting a crown shell to the tooth to be crowned is greatly facilitated, and the time heretofore required and the expense materially reduced.

My invention consists in the peculiar and novel construction of a dental crown shaper for contouring, reducing or enlarging the open end portion of a tooth crown shell, said dental crown shaper having details of construction, as will be more fully set forth hereinafter and claimed.

Figure 1:
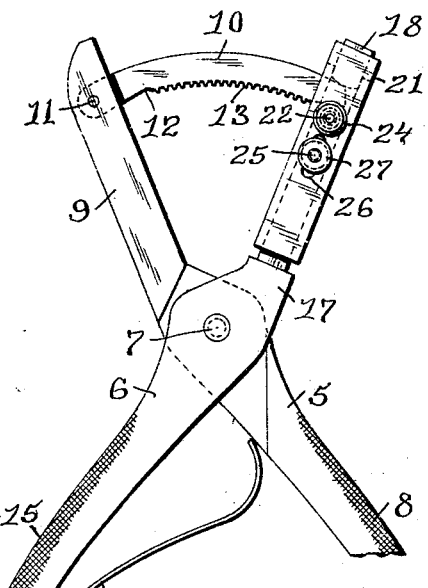
Figure 2:
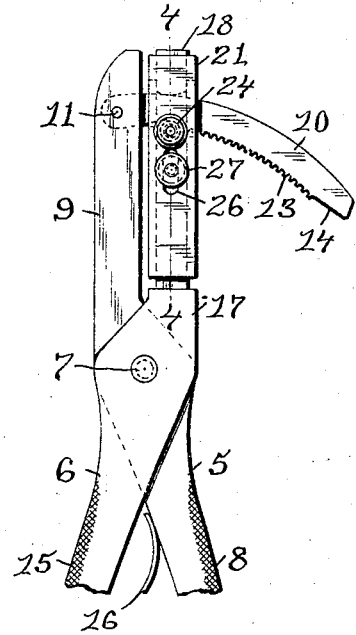
Figure 3:
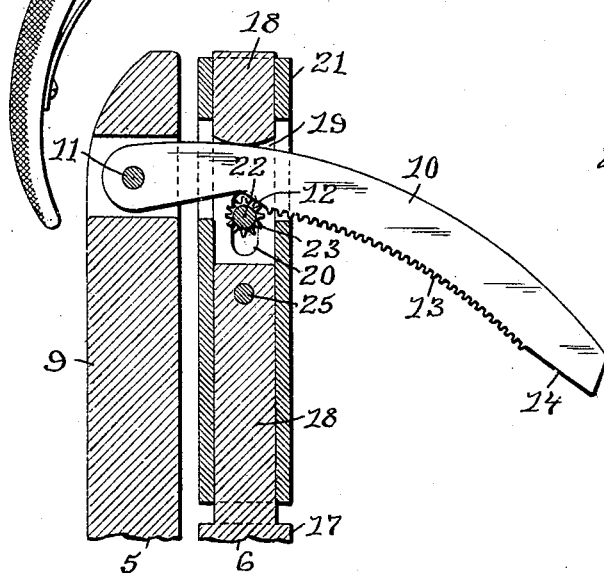

Figure 1. is a face view of my improved dental crown shaper showing the same in the normal or open position. Fig. 2. is a view similar to Fig. 1. showing the instrument in the closed position and the greater portion of the handles broken away. Fig. 3. is an enlarged detail sectional view taken centrally on a line with the opening and closing movements of the instrument and Fig. 4. is an enlarged detail sectional view taken on line 4. 4. of Fig. 2.

Figure 4:
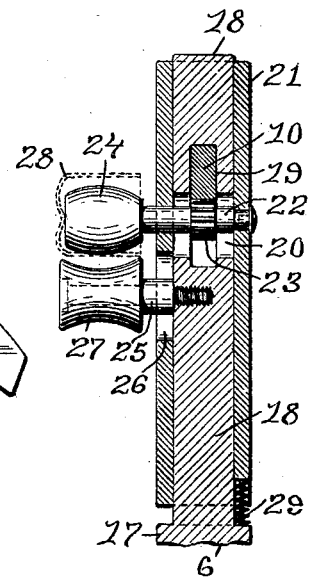

In the drawings, 5. and 6. indicate the operating members of the instrument which are pivotally secured together by a pivot pin 7. and are broadly in the form of a pair of pliers, as shown in Fig. 1. The member 5. has a handle 8. curved to fit the hand on one side of the pivot and a jaw 9. on the opposite side of the pivot. A curved toothed rack 10. is pivotally secured at one end to the jaw 9. by a pivot pin 11. and has a notch 12. in its inner edge adjacent the pivot end, gear teeth 13. on its inner edge and an outwardly beveled inner edge portion 14. extending from the gear teeth 13. to the free end of the rack, as shown in Figs. 2. and 3. The member 6. has a handle 15. curved to fit the hand, a whip spring 16. secured at one end to the handle 15. with its free end engaging with the member 5. and a jaw 17. having an approximately square reduced end 18. through which is an opening 19. for the curved toothed rack 10. and a transverse opening 20. A slide 21. has a sliding fit on the reduced end 18. of the jaw 17. and carries a transverse shaft 22. rotatably supported in bearings in the slide. The shaft 22. extends through the transverse opening 20. in the end 18. of the jaw 17. and has a pinion 23. secured to it in a position to engage with the gear teeth on the rack 10. and a convex roll 24. secured on its outer end, as shown in Fig. 4. A stud 25. is fixed to the face of the end 18. of the jaw 17. and extends through a slot 26. in the slide 21. and a concaved roll 27. is rotatably secured to the stud 25. on a central line with the roll 24. as shown in Figs. 2. and 4.

To contour or reduce the open end portion of a tooth crown shell, a shell 28. is placed over the convex roll 24. as indicated in broken lines in Fig. 4. and the handles 8. and 15. brought together. The outer or convex edge of the curved rack 10. bears on the top of the opening 19. in the jaw 17. as shown in Fig. 3. and the beveled edge 14. on the rack 10. bearing on the pinion 23. first forces the pinion and the slide 21. down which carries the shaft 22. the pinion 23. and moves the convex roll 24. with the shell to within the thickness of the shell, of the concaved roll 27. The gear teeth 13. on the rack 10. now engage with the pinion 23. and revolve the pinion 23. the shaft 22. the convex roll 24., the shell 28. and by friction the concaved roll 27. approximately two and a half revolutions by frictional contact of the shell 28. with the roll 27. When the jaws 9. and 17. are in the closed position, the pinion 23. enters the notch 12. in the rack 10., the slide 21. moves upward, by the action of a spring 29. between the jaw 17. and the slide 21. as shown in Fig. 4., the rolls 24. and 27. separate and the crown is then removed from the roll. To enlarge the open end portion of a tooth crown shell, the shell is placed on the concaved roll 27. and the instrument operated in the same way as for reducing.

It is evident that any shape detachable rolls could be used and that the construction of my improved automatic contouring instrument could be varied, without materially affecting the spirit of my invention.

Having thus described my invention I claim as new and desire to secure by Letters Patent:—

1. In a dental crown shaper, two members operatively secured together, a roll rotatably supported on one of the members, a slide on the roll member, a roll rotatably supported on the slide, means for operating the slide and means for revolving the roll.

2. In a dental crown shaper, two members forming handles and jaws pivotally secured together, a roll rotatably supported on one of the jaws, a slide on the roll jaw, a roll rotatably supported on the slide, and means on the opposite jaw operatively connected with the slide and with the roll on the slide for operating the slide and for revolving the roll on the slide.

3. In a dental crown shaper, two members forming handles and jaws pivotally secured together, a roll rotatably supported on one of the jaws, a slide on the roll jaw, a roll rotatably supported on the slide, means on the opposite jaw operatively connected with the slide and with the roll for moving the slide in one direction and revolving the roll and means for moving the slide in the opposite direction.

4. A dental crown shaper, comprising two members pivotally secured together, one member having a handle and a roll jaw and the other member having a handle and a rack jaw, a roll rotatably supported on the roll jaw, a slide on the roll jaw, a roll shaft extending through an opening in the roll jaw and rotatably supported in the slide, a pinion on the shaft, a roll on the shaft, a rack secured to the rack jaw and extending through an opening in the roll jaw in a position to engage with the pinion on the roll shaft, and means on the rack to operate the slide and revolve the pinion.

5. A dental crown shaper comprising two members pivotally secured together, one member having a handle and a roll jaw and the other member having a handle and a rack jaw, a roll rotatably supported on the roll jaw, a slide on the roll jaw, a roll shaft extending through an opening in the roll jaw and rotatably supported in the slide, a pinion on the roll shaft, a roll on the roll shaft, a toothed rack pivotally secured to the rack jaw and extending through an opening in the roll jaw, in a position to engage with the pinion on the roll shaft, said toothed rack having a notch adjacent its pivot end and an inclined portion adjacent its free end, whereby the slide is moved to bring the roll on the slide toward or into engagement with the roll on the jaw and the roll on the slide is revolved, means for automatically moving the slide in the opposite direction, and means for normally holding the pivot members in the open position.

In testimony whereof, I have signed my name to this specification in the presence of two subscribing witnesses.

FERNANDO OSCAR JAQUES, Jr.

Witnesses:
  JOHN H. McNULTY,
  CHAS. H. LUTHER.